June 11, 1968     K. GÄRTNER ET AL     3,387,542
METHOD OF JOINING SETS OF STACKED, SUPERIMPOSED SHEETS, AND
APPARATUS FOR APPLYING JOINING STRIPS Filed Oct. 4, 1965     4 Sheets-Sheet 1

Inventors:

K. GÄRTNER & E. LÖRCH
by: Stephen K Frishauf
Atty

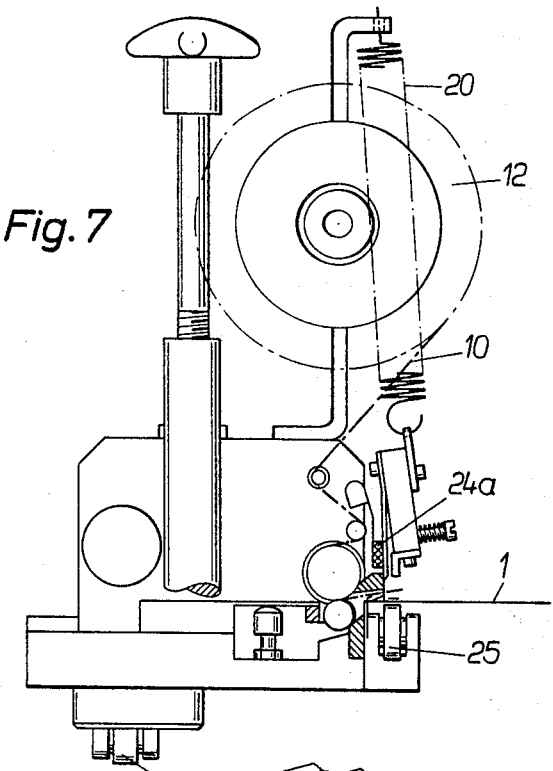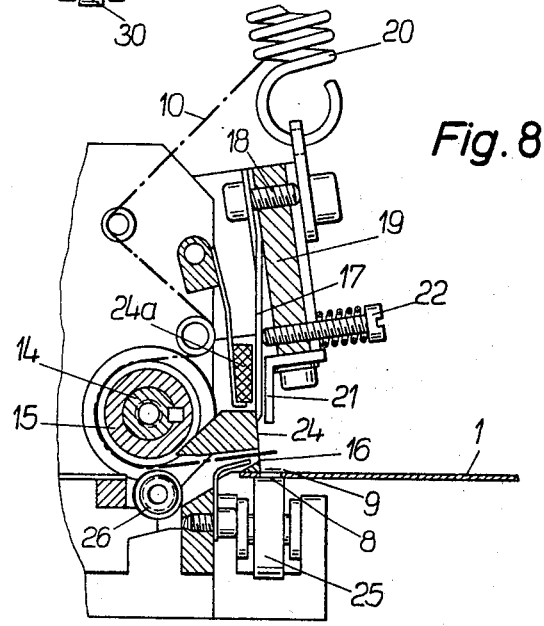

3,387,542
METHOD OF JOINING SETS OF STACKED, SUPER-
IMPOSED SHEETS, AND APPARATUS FOR AP-
PLYING JOINING STRIPS
Karlheinz Gärtner, Neureut, near Karlsruhe, and Erwin
  Lörch, Karlsruhe, Germany, assignors to Messrs. Auto-
  mation für Graphische Technik G.m.b.H., Aarau,
  Switzerland, a corporation of Switzerland
        Filed Oct. 4, 1965, Ser. No. 492,585
    Claims priority, application Germany, Dec. 2, 1964,
                      J 27,016
                 15 Claims. (Cl. 93—1)

ABSTRACT OF THE DISCLOSURE

A thin flexible strip of material is applied to the top surface of the top sheet of a set to partially overlap in edge perforation; the portion of the strip adjacent the perforation is adhered to the top surface, the remaining non-adhering portion of the strip is pressed through the perforation and the strip is folded and adhered against the bottom surface of the bottom sheet of the set. Apparatus to carry out the process includes a strip application station having a severing and application element movable in synchronism with the feed of the sets of material to sever a strip from a supply roll, and further contains an insertion station to insert the strip through a perforation, folded under and glued on the bottom sheet.

---

The present invention relates to a method of joining sets of stacked, superimposed, edge-perforated sheets together, and to apparatus for applying small strips to effect such joining to the stacked sheets, and more particularly to method and apparatus for joining sets of paper sheets having interleaved carbon paper, for example to type multiple copies on an automatic typewriter, teletypewriter, accounting or computer output printing machine.

Sets of superimposed sheets of paper, having carbon paper interlaced between the paper, are often supplied in zig-zag folded form, and stacked to be supplied to the roller, or platen of a typewriter or similar apparatus. When manufacturing such sets of paper, particularly if the individual sheets already have information, or columns printed thereon, it is important that the single sets of the entire stack are fixed with respect to each other, so that as the columns, and rows of the paper are typed on, the superimposed sheets are in exact alignment or registration. It has been proposed to join the various sheets of paper together by means of clips or spots of an adhesive; it has also been proposed to apply adhesive material to the edge, or press adhesive through the various sheets of the sets, or to apply small tongues pressed into the sets, so that the individual sheets are crimped together. Rigid connection between the individual sheets of a set, however, had disadvantages; metallic clips or crimps, or staples, were not siutable because they did not permit a slight amount of individual motion between the sheets as they were folded, or unfolded, or rolled through a typewriter or computer output printer; folds or creases developed between the sheets as they were run through, for example, a computer output printer. In order to provide for a limited relative motion of the sheets with respect to each other, and still for joining of the sheets together, it has been proposed to interconnect the topmost and lowermost sheets of a set by means of a U-shaped clip, which pass through holes provided in the sheets. Many of these sheets are already provided with holes, or edge perforations, in order to provide for engagement of toothed wheels into the holes and for positive transport of the sheets. These same holes could be used to pass the U-shaped strips therethrough. It has, however, been found difficult to manufacture such sets and pass these small strips through the holes.

It is an object of the present invention to provide a method for readily assembling sets of superimposed sheets of material together by means of strips passing through holes in the sets, which method is easily carried out and adapted for application by an automatic machine.

Briefly, in accordance with the present invention, a thin, flexible strip of material, for example paper, is applied to the top surface of the top sheet of a set. The strip is gummed on its undersurface and adhesively secured to the top sheet in such a way that it partially overlaps an edge perforation, and is glued to the region of the top sheet of the set next to the perforation. The portion of the strip which overlaps the hole, and which may extend therebeyond, and which is free and not glued, is then pressed through the edge perforation and, either simultaneously or almost simultaneously therewith, or subsequent thereto, folded back against the bottom surface of the bottom sheet, where the strip is again adhesively secured, thus forming a small U-shaped strip gripping the top and bottom sheets. The portions of the strip which contact the top and bottom sheets of the set are then adhered firmly, for example by passing them between a pair of rollers. The strips are preferably pregummed, or contain pressure-sensitive adhesive material. They may be cut from a roll of such strip material and applied to the sets in synchronism with a feed motion of the sets during a continuous manufacturing process.

It is another object of the present invention to provide a fastening apparatus to secure sheets of a stack together, which is simple in operation, accurate, rapid, and inexpensive.

Briefly, in accordance with another aspect of the present invention, an apparatus to secure the strips to the sheets is provided which has a series of stations; first, a strip application and severing station which advance the strip from a supply roll of strip material, severs a correct amount of strip material, and applies it by means of a punch, which may be combined with a severing knife or severing mechanism to the topmost sheet. Of course, the strip may have previously been perforated in such a way that severing is simple and cutting is not necessary; the adhering operation, that is, adhering the strip next to an edge perforation, could be done by hand; in accordance with the present invention, however, the apparatus feeds, severs, and applies the strip to the topmost sheet, the motion of the severing and applying mechanism being synchronized with the feed of the sets. Beyond the strip application and severing station, a strip insertion station is located, which has means, for example projections on a wheel rotating in synchronism with the feed of the sets, to press that portion of the strip through the perforation which is not adhered thereto; a folding station is arranged beneath, or alongside the strip insertion station to fold the strip back over against itself so that it lies flat against the bottom surface of the bottom sheet of the set. The sheets are then, preferably, passed between a pair of rollers, one of which may have a raised portion over part of its circumference, to pass the folded and already preliminarily adhering strips therebetween and secure them against the top surface of the top sheet and the bottom surface of the bottom sheet respectively.

The apparatus preferably includes a reciprocating knife, although a disc knife intermittently brought into contact with the advancing strip from the strip supply roll may also be used; preferably, a pad which may be soaked in a solvent prevents accumulation of adhesive on the knife due to its contact with the adhesive material on the strip. The strip itself is preferably fed through a thin slot located just above the top sheet of the set; a spring tongue, projecting into the opening bows the strip as it is applied, thus imparting an additional stiffness to maintain dimensional stability during the severing and application operation.

The strip material itself may be of paper or a thin plastic, having an adhesive applied to one side; it is, of course, also possible, and within the contemplation of the present invention, to arrange an adhesive dispenser next to the severing knife, or to apply a small amount of adhesive to the sheets, for example in synchronism and just before the strips are being applied to the sets.

The structure, organization and operation of the invention will now be described more specifically in the following detailed description with reference to the accompanying drawings, in which:

FIG. 7 is a side view of the apparatus according to FIG. 3, partly in section; and FIG. 8 is the apparatus according to FIG. 3, in an enlarged scale, partly in axial section.

Figure 1:
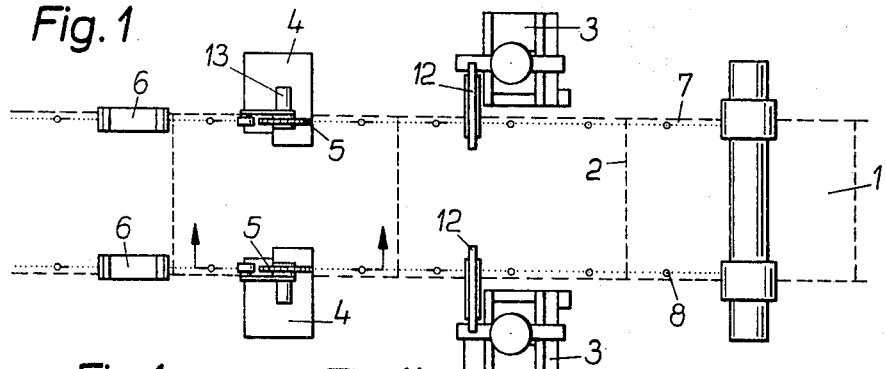
FIG. 1 is a general top view of sheets having strips applied thereto to illustrate the method steps.

The method of joining the strips together will now be described, with particular reference to FIGS. 1 and 2, which illustrate the position of the sets of sheet, and adjoining strip, in successive steps of the method.

A set of paper sheets, which may have carbon paper interleaved therein, is fed from the right of the sheet in the drawings (considering the reference numerals rightside up) towards the left. Perforation lines, extending transversely of the sheets for later severance, or for zig-zag folding, are indicated at 2. On both sides of the sheets, strip application stations 3 are provided. A form of apparatus suitable for these stations will be described later. The action of the strip application station is carried out synchronously with the feed of the sets 1.

Arranged in the direction of feed, and beyond the strip application 3, are a pair of adhering and strip insertion stations which are provided with means to press the strip applied at station 3 through perforations of the set 1, such means being schematically indicated at 5. Simultaneously with the insertion of the strips through the perforation, they are folded around to adhere to the bottom surface of the bottom sheet as well as to the top surface of the top sheet. The adhered strips are secured and pressed together at pressing stations 6. Both the insertion and pressing together is carried out synchronously with the feed of the sets 1.

Figure 1C:
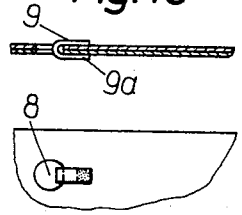
FIGS. 1a, 1b, and 1c, illustrate successive steps occurring during carrying out of the method, both in plan, and in sectional view.
Figure 1B:
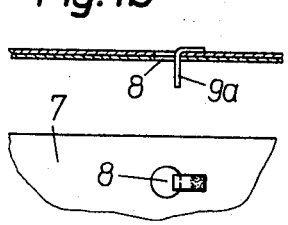
Figure 1A:
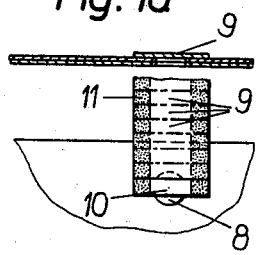

The method of applying the strips, and adhering them to the sets is best illustrated in connection with FIGS. 1a, 1b, and 1c. The sets are provided with edge portions 7, perforated as at 8, in order to provide openings for insertion of sprocket, or toothed wheels to provide for the feed of the material. As the sets 1 are fed past the strip application stations, small strips 9 of strip material 10, which may be paper or plastic, are applied to the top surface of the top sheet, in such a manner that each strip 9 covers a perforation within a set, preferably at least one on either side between the transverse creases 2 of any set. Referring particularly to FIG. 1a, the strips 9 are gummed at their edges, for example by having a pressure-sensitive adhesive applied thereto as shown at 11, and applied in two parallel strippings to the edge portions of the strip 10. After applying a strip 9 to the top surface of the top sheet of the sets, as shown at FIG. 1a and particularly the cross-sectional view thereof, the sets 1, with the applied strips 9, are moved to the insertion and folding station 5. One of the portions, as shown the one on the trailing side of any one of the perforations 8, is already adhered to the top surface of the strip, whereas the leading end portion of the strips 9 are not adhered. At the insertion and folding station 5, the strips 9 are pressed through the perforation as best seen in FIG. 1b. The depending portion 9a is then folded back over itself to come into contact with the bottom surface of the bottom sheet of the sets 1, as best seen in the cross-sectional view of FIG. 1c. Thereafter, the now U-shaped strips 9, 9a are secured, for example by pressure both against the top and the bottom sheets at securing station 6. The sets themselves can then be folded or severed at crease lines or perforations 2, in conventional apparatus not shown.

Figure 2:
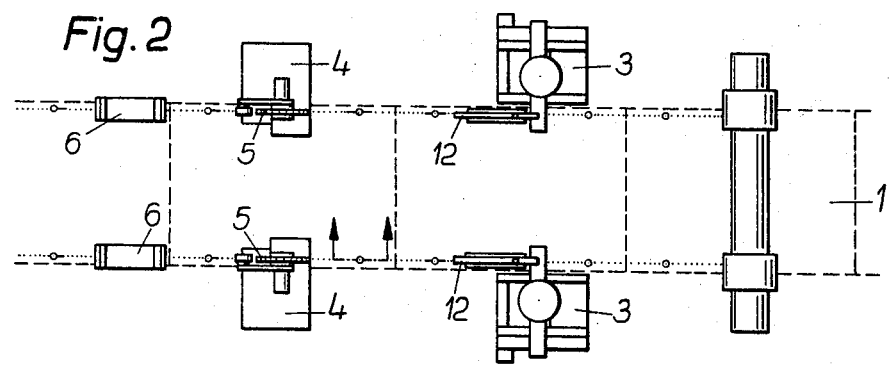
FIG. 2 illustrates a different method of application of strips.
Figure 2A:
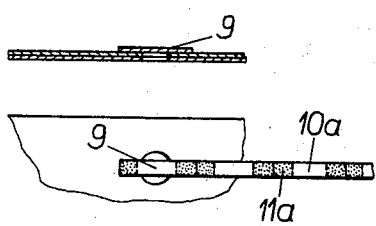
FIG. 2a is an enlarged detail view, both in plan and in section, of strip application.

FIG. 2, wherein similar reference numerals illustrate similar elements, illustrates a different form of application of the strips. In accordance with FIG. 1, the strips 9 are obtained from a roll of strip material 12 in such a manner that the roll is fed transverse to the direction of the feed of sets 1. The method of securing the sets together can also be carried out by strips which are fed parallel to the direction of feed of sets 1, as illustrated more particularly in FIG. 2. The supply rolls 12a for the strip materials 9 contain strip material 10a, which has the width of the strips 9 to be applied. Strip material 10a is gummed intermittently, as shown at 11a. Prior to applying strips 9 to the sets 1, the strips are severed intermediate the gummed regions 11a, as is best shown in FIG. 2a of the drawings. In all other respects the method of application of the strips is the same as that discussed in connection with FIG. 1, and FIGS. 1a, 1b, 1c.

While the strips can be severed from the roll of supply material by hand, for example by scissors, applied to sets 1 by hand, or by means of a small plug, inserted and folded over itself by means of simple tools, it is preferred to have the entire method carried out automatically, and sequentially, by apparatus synchronized with the feed motion of the rolls themselves.

Figure 3:
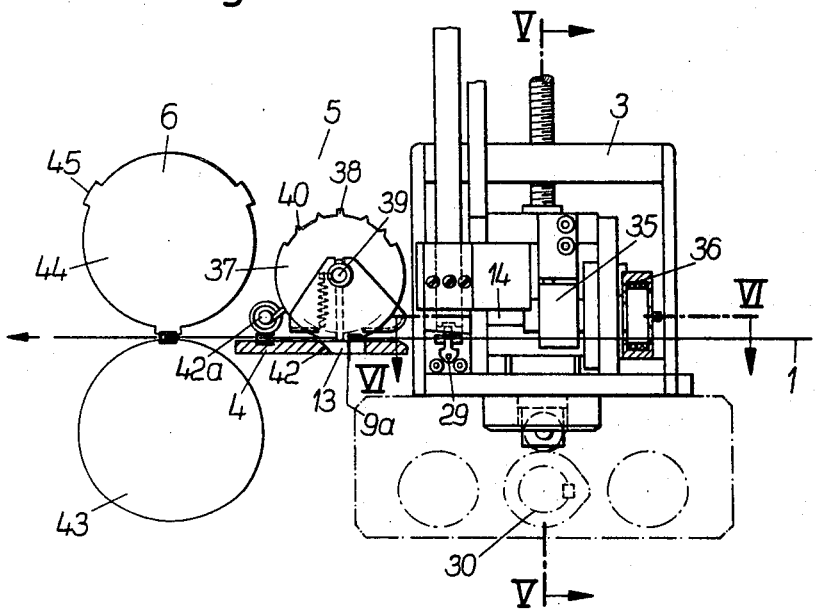
FIG. 3 illustrates an apparatus, in side view, to apply strips to sets of sheet material.
Figure 4:
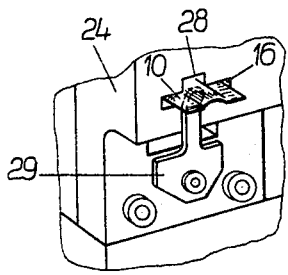
FIG. 4 is an enlarged partial view of the strip application region of the apparatus of FIG. 3.
Figure 5:
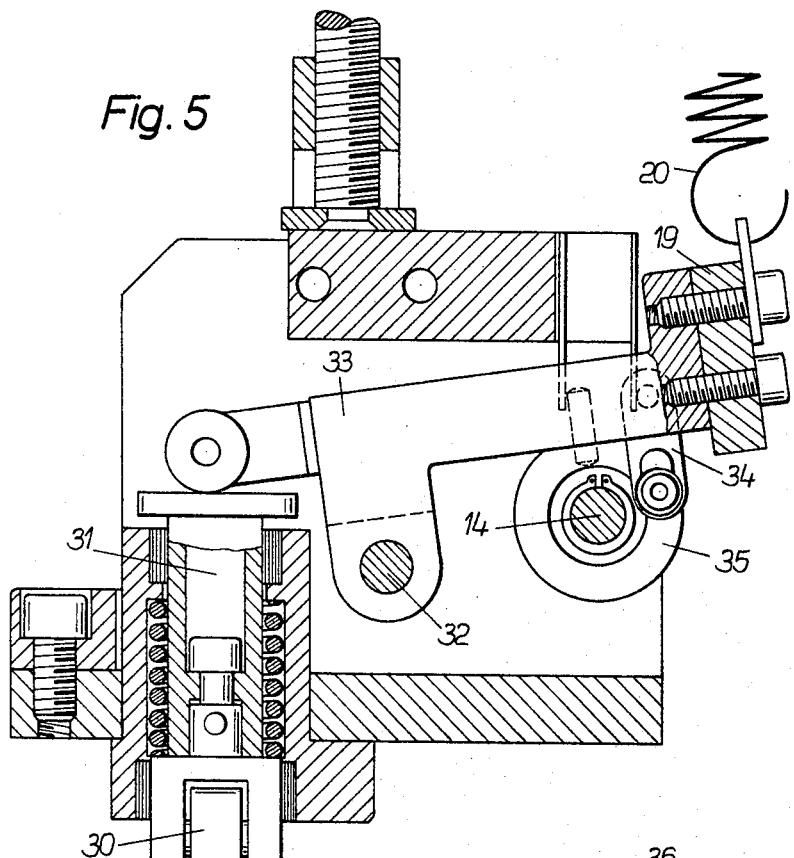
FIG. 5 is a sectional view along line V—V of FIG. 3.
Figure 6:
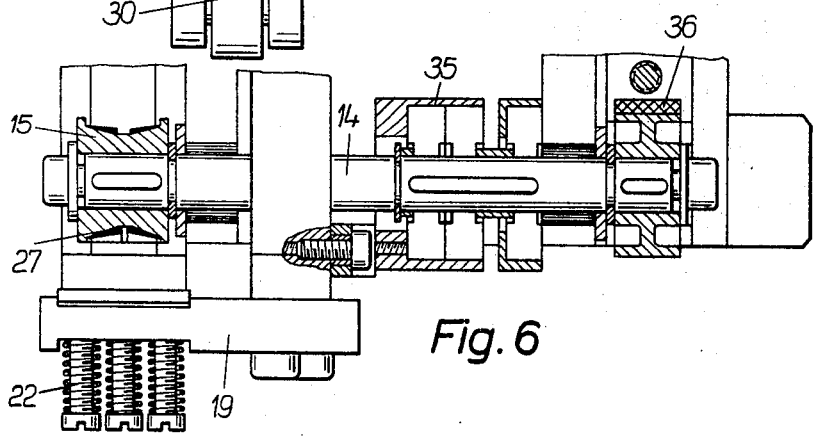
FIG. 6 is a cross-sectional view through the shaft of the strip material feed roll, along line VI—VI of FIG. 3.

Referring now to FIGS. 3 through 8:

A strip application station 3 has a shaft 14 having a strip feed roller 15 applied thereto (FIGS. 3 and 6). Shaft 14 is driven in synchronism with the feed motion of the sets 1. The material feed roller 15 (FIGS. 6 and 8) preferably has a double frusto-conical form and may have a surface which is knurled, as shown at 27. Feed roller 15 pushes an end of the material 10, applied from the supply roller 12 (FIG. 7) through a slot-formed opening 16, which is just slightly above the plane of the edge portion 7 of the sets 1 (FIG. 7, FIG. 8). Slot 16 is so positioned that a severing knife 17, reciprocating in synchronism with the feed motion of the sets 1, severs during downward motion the strips 9, which are of such width that they can just pass through one of the perforations in edge portion 7 of a set. Knife 17 is secured at 18 (FIG. 8) to a movable weight 19, which is connected to a return spring 20 and further contains a pressing end, or plug 21, which presses the end of a strip 9 against the top surface of the top sheet of a set 1 (see FIG. 8). The feed motion of the sets 1, and the severing and applying motion of elements 17, 19, 21 are so synchronized, that a severed strip 9 is positioned to be adhered adjacent to a perforation 8, and covering the perforation as illustrated in FIGS. 1 and 2. Knife 17 is resilient pressed, by means of a bolt and spring arrangement 22, against a running surface 24, which has a pad 24-a associated therewith which may be soaked with a solvent for the adhesive 11 applied to the strip material 10. This prevents gumming of the knife, and fouling of the severing step.

Sets 1 are supported in the region of the slot 16 by a counter roller 25 (FIGS. 7, 8); the strip material 10 is held against the feed roller 15 by a counter roller 26. The double conical surface 27 of strip tape feed roller 15 (see particularly FIG. 6) feeds the material to slot 16. Slot 16 is widened at one of its longer dimensions (FIG. 4) and a resilient tongue 29 extends into the widened region in order to buckle or corrugate the end 10 of the strip material. This provides for ease of application of the little strip 9 on the set 1, and prevents adhesion of the strip 9 to the guide, a slight surface beneath the slot 16.

The feed shaft 14 is driven by means of an eccentric drive 30 (FIGS. 3 and 5) which is synchronized with the motion of the sets 1. A resiliently mounted follower 31 of the eccentric drive 30 acts on a lever 33, rotatably mounted at 32, which carries on its free end the mass 19, and is further connected by means of a crank 34 to the shaft 14. The connection is by means of an intermediately placed one-way clutch 35, combined with a brake mechanism 36 (FIG. 6) to provide intermittent drive of the shaft 14 without free running of feed roller 15, however.

The above-described mechanism is particularly adapted for use with the severing and application of the strips 9 to the topmost sheet of the sets 1, although other means may also be employed, for example rotating knives having disc shape with projections to sever the strip, and located such that intermittent severing occurs; or disc shaped knives eccentrically mounted and engaging the strip 10 intermittently; or other severance and application mechanisms.

The insertion station 5 includes a wheel 37 (FIG. 3) which is provided with projections 38 on its circumference. Wheel 37 is journalled at 39. Besides the projections 38, transport teeth 40 are provided, which engage those holes 8 in the sets 1, which do not have a strip 9 applied thereto. Thus, wheel 37 is rotated in synchronism with the feed motion of the sets 1. Projections 38 are arranged to engage those holes 8 which do have strips 9 applied thereto. When a projection 38 meets one of those holes, strip 9 is pressed through the perforation, forming depending portion 9–a, as particularly seen in FIGS. 1b and 3. Below the wheel 37, a folding plate 4 is provided which has a front edge 42 which is tapered, as particularly shown in FIG. 3, in order to fold the depending portion of the strip 9a back upon itself. The folding plate 4 is formed with an opening, or recess 13, to receive the projection 38 of wheel 37.

Small, resiliently journalled pressing rollers 42a are preferably arranged close to the insertion and folding station (as seen in FIG. 3) in order to provide for good adhesion of the folded strips 9. To further improve the adhesion, a pressing station 6 is provided, which presses the sets together in the region where the strips are applied, in order to further secure the sheets of the set. Pressing station 6, as shown in FIG. 3, consists of a pair of rollers 43, 44, one of which has projections 45 thereon. Ordinarily, feed of the sets 1 will rotate rollers 43, 44; the projections 45 are so located on the circumference of the roller 44 that they engage the strips 9 and press them between rollers 44, 43.

The drive of wheels 37, 42–a, 43, 44 may be obtained directly from the feed motion of the sets 1, or an independent drive by shafts, not shown, may be provided. Such independent drive should be in synchronism with the feed of the sets 1.

The operation of the apparatus described is as follows: The plug or pressure element 21 (FIG. 8) presses strips 9 on the sets, after the strips 9 have been severed from the strip material 10, supplied by supply roll 12. The attachment is adjacent the trailing edge of a perforation 8, on the top surface of the top sheet of a set 1. The strips 9, preliminarily placed and adhered adjacent the trailing side of a perforation then reach the region of wheels 37, in which the projections 38 of the wheels press that portion of the strip 9 which extends over the perforation through the perforation 8, as seen particularly in FIG. 3 at 9–a, in such a manner that the free portion 9a will meet the tapered surface 42 of plate 4, to be folded over against itself and form a small, U-shaped clip across the perforation. It is preferred to mount wheels 37 resiliently, as indicated schematically in FIG. 3 by the dashed spring connected to journal 39. The small U-shaped strips are then finally secured and adhered by means of roller 42–a, and, if necessary, by subsequent pressure rollers 43, 44, one of which has projections 45 thereon.

The present invention has been illustrated in connection with an apparatus to secure together sets of paper, for example having interleaved carbon paper, and useful, for example, to provide multiple copy read-out from accounting machinery, computers, and the like. Various structural changes and modifications, as determined by requirements for particular applications, or particular materials to be secured, may be made without departing from the inventive concept.

We claim:

1. Method of joining a set of stacked, superimposed, edge-perforated sheets comprising applying a thin, flexible strip of material to the top surface of the top sheet of the set, said strip being gummed on its surface contiguous with the top surface, and applied to partially overlap an edge perforation; adhearing the portion of said strip adjacent the perforation to said top surface; pressing the remaining, non-adhearing portion of said strip through the adjacent perforation; and folding and adhearing said remaining portion of said strip against the bottom surface of the bottom sheet of said set.

2. Method as claimed in claim 1 wherein said adhering steps include applying pressure against the folded portions of said strip.

3. Method as claimed in claim 1 wherein said sets are progressively advanced; and said application step includes the step of progressively advancing strip material from a strip material supply roll in synchronism with the progressive advance of said strip and severing strip from said strip material.

4. Method as claimed in claim 3 wherein said strips are fed in the direction of advance of said sets, said strips being fed from said strip material supply roll, said strip material supply roll being of a width which is the same as the length of said severed strip.

5. Method as claimed in claim 3 wherein said strips are fed in a direction transverse to the advance of said sets, said strips being fed from a strip material roll having a width equal to the width of said severed strips, and being severed along their length.

6. Method as claimed in claim 2 including the step of pressing said sets, having said folded strips applied thereto together.

7. Fastening apparatus to secure together sets of stacked, superimposed, edge-perforated sheets of material by means of flexible, adhesively coated strips extending through said perforations, adapted to be supplied from a strip material supply roll, comprising means feeding said sets of material past a reference point; a strip application station having a severing and application element moveable in synchronism with the feed of said sets of material past said reference point to sever a strip from said roll and apply said severed strip to the top surface of the top sheet of said set, and located so that a portion of said strip is adjacent a perforation and another portion extends over said perforation; an insertion station located downstream in the direction of feed of the material and spaced from said strip application station, said insertion station having an element formed with a projection to engage said strip extending over said perforation and press it through said perforation to extend therethrough; and a folding station to fold said strip back and upon the bottom surface of the bottom sheet of said sets.

8. Apparatus as claimed in claim 7 including a pair of rollers located above and below said sets in the region of said perforations and arranged in the direction of feed of the material from said folding station to press said first portion of said strip and said folded portion of said strip against the top, and bottom surfaces, respectively, of the sheets of said set.

9. Apparatus as claimed in claim 7 wherein said strip application station includes guide means formed with a narrow slot therethrough to guide strip supply material, and a resiliently supported knife moveably mounted to sever said strip from said material.

10. Apparatus as claimed in claim 9 wherein said narrow slot has a central enlargement, and a resilient tongue, having a rounded end is mounted to project into the enlargement to bow said strip material as it passes through said slot.

11. Apparatus as claimed in claim 7 including a feeding means operatively associated with said strip material and feeding said material from said supply roll, said means including a feed roller having a double conical surface.

12. Apparatus as claimed in claim 7 wherein said application station includes a knife arranged for severing movement against said strip material in synchronism with the feed of said sets, and adhesive solvent means including a spongy pad associated with said knife and located to be in contact with said knife to clean said knife after contact with the adhesively coated strip.

13. Apparatus as claimed in claim 7 wherein said insertion station comprises a wheel having projections formed on its circumference, said projections being spaced on the circumference by the distance of said perforations having said strips applied thereto and engaging said strips to press them through said perforations; and means rotating said wheel in synchronism with the feed of said sets.

14. Apparatus as claimed in claim 7 wherein said folding station includes a plate located below the bottom sheet of said sets, said plate having a wedge-shaped surface arranged to be presented to said strips inserted in said perforations and folding said strips against the bottom surface of the bottom sheet of the sets as the set is fed over and past said plate.

15. Apparatus as claimed in claim 14, wherein said folding station is arranged beneath said insertion station and said plate is formed with a recess to receive the projection of said element of said insertion station.

References Cited
UNITED STATES PATENTS

| | | | |
|---|---|---|---|
| 1,645,013 | 10/1927 | Kondolf | 93—91 |
| 1,841,911 | 1/1932 | Pierce | 93—91 X |
| 2,108,462 | 2/1938 | Wiswall | 282—11.5 |
| 2,108,471 | 2/1938 | Bovier | 282—11.5 |
| 2,136,343 | 11/1938 | Johnson | 282—11.5 |

WILLIAM W. DYER, JR., *Primary Examiner.*

WAYNE A. MORSE, JR., *Examiner.*